April 28, 1931. T. V. HEMMINGSEN 1,802,423
FILTER FOR FINE FILTERING OF FLUIDS ESPECIALLY FUEL OILS
Filed Jan. 31, 1929 2 Sheets-Sheet 1

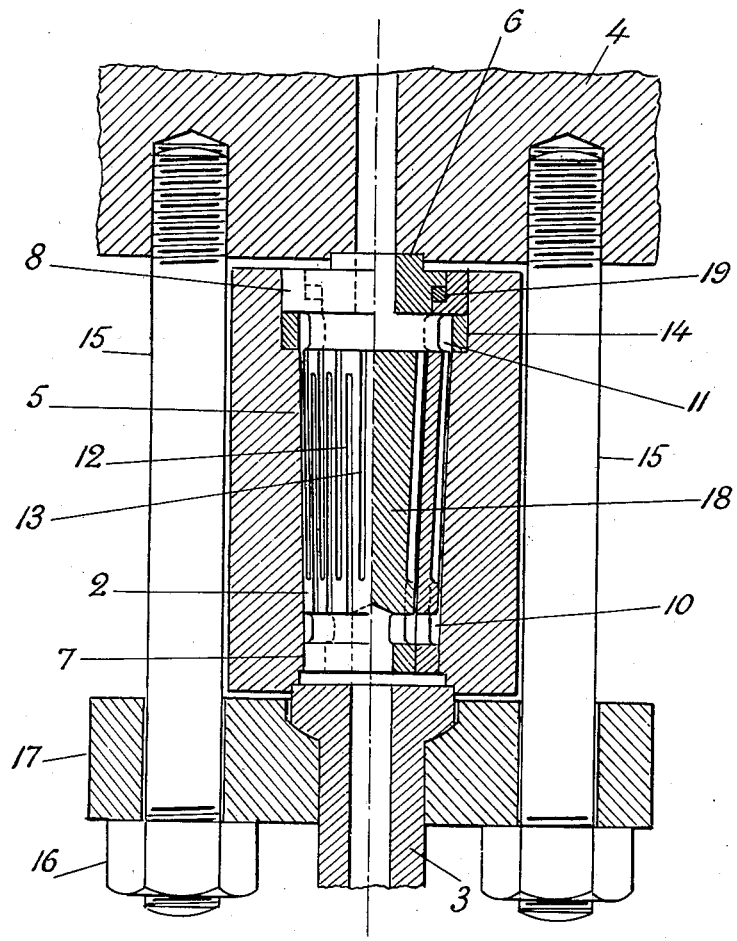

Patented Apr. 28, 1931

1,802,423

UNITED STATES PATENT OFFICE

TORKILD VALDEMAR HEMMINGSEN, OF COPENHAGEN, DENMARK

FILTER FOR FINE FILTERING OF FLUIDS ESPECIALLY FUEL OILS

Application filed January 31, 1929, Serial No. 336,591, and in Denmark March 1, 1928.

Figure 1:
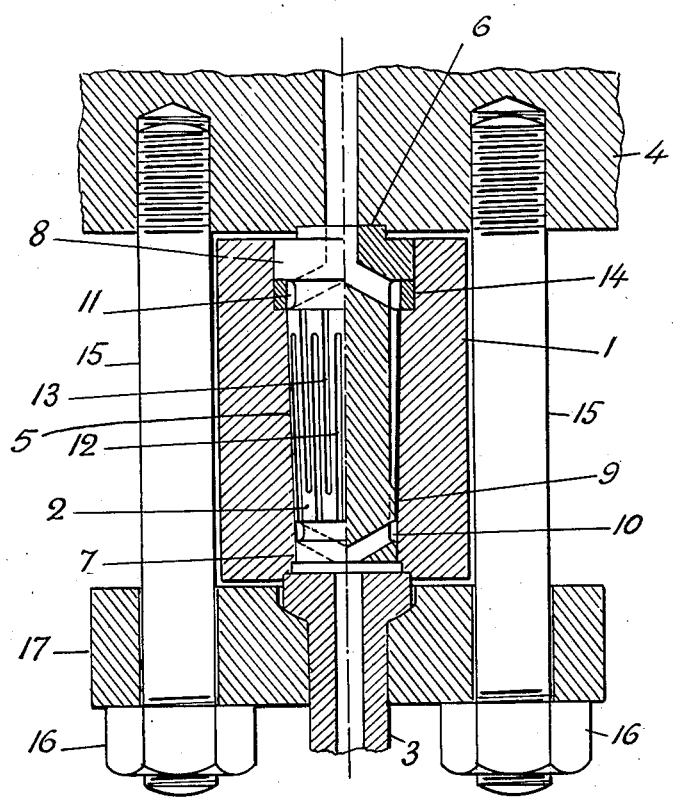
Figure 2:
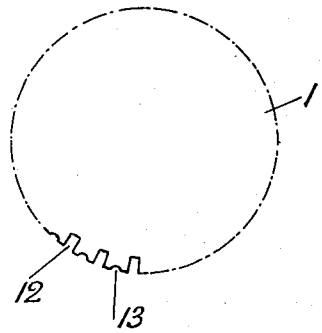

The invention relates to a filter for the fine filtration of fluids, especially fuel oils for internal combustion engines, of the type consisting of a chamber provided with inlet and outlet connections and one or more conical surfaces and a correspondingly-shaped plug or filter body centrally located in said chamber and axially displaceable along the axis thereof so that between the filter body and the surrounding chamber a narrow ringshaped filter passage is produced. A number of longitudinal grooves are provided in the conical surface or surfaces of the filter body, these grooves being arranged in two series, one of which communicates with the inlet connection of the filter chamber and the other with the outlet connection, in such a way that the fluid entering through the inlet connection and flowing to the first series of grooves has to pass through the narrow filter passage between the filter body and the surrounding chamber in order to reach the other series of grooves from which it flows to the outlet connection, filtering being effected when the fluid passes through the said narrow passage. According to the present invention spacing members or the like are provided by means of which the position of the filter body within the chamber may be fixed in the axial direction and centering devices are provided for centering the filter body within the surrounding chamber. The plug-shaped filter body may be provided with a central axial bore or chamber containing another filter body with one or more conical surfaces which is axially adjustable in relation to the first filter body. This second filter body may in similar manner be provided with a bore containing a third filter body so that adjustable filter passages are formed between corresponding conical surfaces of each pair of bodies. The improved filter can be produced with a high degree of accuracy as the plug-shaped filter body after being machined and ground, is ground in with the conical bore of the filter chamber in the same manner as when grinding a valve into its seat. This grinding makes the surface of the filter body and the bore of the filter chamber correspond exactly to each other so that the filter passages will be of the same width at any point between the conical surfaces of the filter chamber and the filter body, when the latter is displaced a suitable amount lengthwise while it is guided so that it moves strictly in axial direction. The filter body may be kept in the adjusted position by ring-shaped spacers, screws or the like, and its central position in the filter chamber may for instance be ensured by means of cylindrical guiding surfaces at the two ends of the filter body which surfaces are guided in corresponding cylindrical recesses in the filter housing. The series of grooves in the surface of the filter body are straight running longitudinally in the filter body. The grooves may be of any suitable depth with square, U-shaped, V-shaped or similar cross section. For the purpose of the invention the grooves accommodating the unfiltered liquid are preferably made considerably deeper than those used for carrying away the filtered liquid, this arrangement offering plenty of room for accumulation of retained impurities in the inlet grooves, it being thus unnecessary to remove the filter for cleaning as often as would otherwise be the case. This provision to a great extent diminishes the inconvenience which the accumulated impurities might cause in hampering the free passage of the fluid. However the grooves carrying off the filtered fluid are not made deeper than necessary for a free passage of the fluid. The advantage of the above arrangement is that the latter grooves are easily accessible for inspection and cleaning which is of great importance, as these grooves must be perfectly clean, when the filter body after a cleaning operation is again placed in the filter chamber, whereas a negligible amount of dirt in the inlet grooves is harmless. The accompanying drawing shows designs according to the invention: Fig. 1 shows in part a vertical section through a filter. Fig. 2 shows a cross section in larger scale through the filter body, only some of the grooves being shown, and Fig. 3 is a view corresponding to Fig. 1 of a filter with a multiple filter body. In Fig. 1 the filter housing is marked by 1. It is provided with the conical bore 5 for the plug-shaped conical filter body 2 and also with connection 3 for the feed pipe. The upper end of the filter body 2 has a plain smooth surface 6, whereby a non-leaking connection is made to a pump housing, tank or nipple 4, which is held tight against the plain surface 6 by proper arrangements, for instance as shown by means of bolts 15 with nuts 16 and a flange 17, whereby the nipple 3, the filter housing 1, and the filter body 2 are fastened to the pump housing or the nipple 4. At both ends of the filter body 2 cylindrical guiding surfaces 7 and 8 are provided matching with corresponding cylindrical recesses in the housing 1. The middle part of filter body 2 is shaped like a slender cone 9, separated from the recesses 7 and 8 by recesses or clearance grooves 10 and 11 which facilitate machining and finishing operations of the conical and cylindrical surfaces and serve for the distribution to the grooves 12, on the surface of the filter body of the unfiltered fluid entering through the inlet, and conduct to the outlet the filtered fluid coming from the grooves system 13. As mentioned the process of filtering takes place when the liquid passes from the grooves 12 to grooves 13, through the narrow ring-shaped passage provided between the conical surface 9 of the filter body and the conical bore 5. The width or size of this passage can be adjusted by displacing the filter body 2, axially in the bore 5 and securing it in the desired position by means of a ring 14, which fits perfectly into the cylindrical part which accommodates the guide 8. The ring 14 is situated between the underside of the guide 8 and a projection formed by the cylindrical part of the filter housing 1. The width of the filter passage may be adjusted by replacing the ring or washer 14 with a thicker or thinner washer. The design shown in Fig. 3 corresponds to the one described above with the exception of the plug-shaped filter body 2 which in this case is provided with a bore accommodating a second filter body 18 corresponding in shape to filter body 2 and adjustable in relation to filter body 2 in axial direction so that a filter passage is formed also between these two bodies. In this case also the width of the passage can be maintained by insertion of a ring or washer 19, corresponding to the ring 14. This second filter body 18, may in turn have a central bore accommodating a third filter body so that adjustable filter passages are formed between mutually corresponding conical surfaces on the filter elements. The adjustment of the width of the passage may be effected by other means than that of replacing the washers 14 or 19, for instance by screws or other suitable arrangements by means of which the filter body is adjusted axially in the bore and fixed in the desired position. In Fig. 2 are shown in profile types of corresponding feed and drain grooves 12 and 13. The feed grooves 12 are deep grooves with rectangular cross section while the drain grooves 13 are comparatively shallow and with a cross section which allows perfect cleaning, having the shape of a segment of a circle or having the bottom bounded by a curve of great radius. In the construction shown in Fig. 1 as well as in Fig. 3 the filter bodies are kept in position by the single smooth surface 6 which matches with a corresponding smooth surface on the upper nipple 4. In a filter as shown in Fig. 3 any of the filter bodies may be provided with a protruding part matching with a corresponding smooth face on the nipple or tank 4.

I claim:

1. A filter for fine filtration of fluids consisting of a housing with an inlet and an outlet passage, and a conical bore, a filter body having the same taper as said bore, means for axially displacing said body in the bore thereby providing an adjustable annular filter passage between the conical surfaces of the filter body and said bore, the conical surface of said filter body having alternating longitudinal grooves communicating with said inlet and outlet passages respectively; said displacing means comprising a distance piece at one end of said body and securing elements therefore; said first filter body being provided with a conical bore and a secondary filter body of the same conicity as said first filter body bore and provided with alternating surface grooves communicating respectively with said inlet and outlet passages.

2. A filter for fine filtration of fluids consisting of a housing with an inlet and an outlet passage, and a conical bore, means for axially displacing said body in the bore thereby providing an adjustable annular filter passage between the conical surfaces of the filter body and said bore, the conical surface of said filter body having alternating longitudinal grooves communicating with said inlet and outlet passages respectively; said displacing means comprising a distance piece at one end of said body and securing elements therefore; said first filter body being provided with a conical bore and a secondary filter body of the same conicity as said first filter body bore and provided with alternating surface grooves communicating respectively with said inlet and outlet passages, a centering collar at one end of said second filter body adapted to engage in the corresponding recess in said first filter body, a filling piece under said collar, an annular groove being provided in said first filter body adapted to furnish an annular space between said first distance piece and the filter body.

3. A filter for fine filtration of fluids consisting of a housing with an inlet and an outlet passage, and a conical bore, a conical filter body having the same taper as said bore, means for axially adjusting said body in the bore thereby providing an adjustable annular filter passage between the conical surfaces of the filter body and said bore, the conical surface of said filter body having alternating longitudinal grooves communicating with said inlet and outlet passages respectively; said adjusting means comprising an annular flange integral with said body and larger than the largest diameter of the cone of the body; a filler piece of the same diameter as said flange, a recess being formed in the housing in which said flange and the filler piece fit snugly and securing elements for tightly holding said filter body under all conditions.

4. In a filter according to claim 3, an annular groove being provided on said filter body adapted to furnish a space between said filler piece and said filter body, said securing elements consisting of end blocks for the housing and clamping bolts adapted to connect said blocks.

5. A filter for fine filtration of fluids consisting of a housing with an inlet and an outlet passage, and a conical bore, a conical filter body having the same taper as said bore, means for axially adjusting said body in the bore thereby providing an adjustable annular filter passage between the conical surfaces of the filter body and said bore, the conical surface of said filter body having alternating longitudinal grooves communicating with said inlet and outlet passages respectively; said adjusting means comprising an annular flange integral with said body and larger than the largest diameter of the cone of the body, a recess being formed in the housing in which said flange fits snugly, a filler piece inserted in said recess between its bottom and said flange and securing elements for tightly holding said filter body under all conditions.

In testimony whereof I affix my signature.

TORKILD VALDEMAR HEMMINGSEN.